United States Patent
Bergen

(10) Patent No.: US 6,669,085 B1
(45) Date of Patent: Dec. 30, 2003

(54) MAKING LANGUAGE LOCALIZATION AND TELECOMMUNICATIONS SETTINGS IN A MULTI-FUNCTION DEVICE THROUGH IMAGE SCANNING

(75) Inventor: George Fred Bergen, Caldwell, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/214,627

(22) Filed: Aug. 7, 2002

(51) Int. Cl.[7] .............................................. G06F 17/00
(52) U.S. Cl. .............................. 235/375; 704/8; 704/7; 717/137
(58) Field of Search ................................. 235/375, 485, 235/487; 704/1, 2, 3, 8, 9, 7; 715/536; 717/137

(56) References Cited

U.S. PATENT DOCUMENTS

| | | | | |
|---|---|---|---|---|
| 4,337,375 A | * | 6/1982 | Freeman | 704/260 |
| 5,157,606 A | * | 10/1992 | Nagashima | 704/2 |
| 5,287,199 A | * | 2/1994 | Zoccolillo | 358/402 |
| 5,295,181 A | * | 3/1994 | Kuo | 379/100.07 |
| 5,351,189 A | * | 9/1994 | Doi et al. | 704/3 |
| 5,416,903 A | * | 5/1995 | Malcolm | 345/703 |
| 5,797,011 A | * | 8/1998 | Kroll et al. | 717/137 |
| 5,903,859 A | * | 5/1999 | Stone et al. | 704/8 |
| 5,918,220 A | * | 6/1999 | Sansone et al. | 705/408 |
| 5,945,656 A | * | 8/1999 | Lemelson et al. | 235/462.01 |
| 6,047,251 A | * | 4/2000 | Pon et al. | 704/1 |
| 6,078,698 A | * | 6/2000 | Lorton et al. | 382/278 |
| 6,111,207 A | * | 8/2000 | Arterberry et al. | 200/5 R |
| 6,119,079 A | * | 9/2000 | Wang et al. | 704/8 |
| RE37,722 E | * | 5/2002 | Burnard et al. | 713/1 |
| 6,426,798 B1 | * | 7/2002 | Yeung | 358/1.13 |
| 6,530,039 B1 | * | 3/2003 | Yang | 714/38 |

* cited by examiner

Primary Examiner—Karl D. Frech
Assistant Examiner—Edwyn Labaze

(57) ABSTRACT

The present disclosure relates to determining and setting an appropriate localized language (and telecommunications settings when appropriate) on a multi-function device that includes a scanner and a printer. Rather than configuring the language setting for such multi-function devices during manufacturing, the language setting can be configured by the end user after a device is delivered. Advantages of the disclosed system and methods include a decreased variation in the types of devices being manufactured and an associated reduction in inventory tracking and storage costs.

28 Claims, 6 Drawing Sheets

MAKING LANGUAGE LOCALIZATION AND TELECOMMUNICATIONS SETTINGS IN A MULTI-FUNCTION DEVICE THROUGH IMAGE SCANNING

TECHNICAL FIELD

The present disclosure relates to multi-function devices that include a printer and a scanner, and more particularly, to making localized language and telecommunications settings in which such multi-function devices will operate.

BACKGROUND

Printers are generally manufactured for sale into specific regions of the world. The predominant language spoken in a given region is typically the language that is preset as the localized language in which printers manufactured for sale into that region will operate. Thus, when printers are manufactured for sale in France, they are set to operate in the localized French language. A user living in France might therefore expect that a printer purchased in France will operate in the localized French language and come from a distribution center that maintains an inventory of printers manufactured for distribution in France.

Multi-function devices that combine a printing function with other functions such as scanning, faxing, and copying, are likewise manufactured for sale into specific regions of the world. Settings made during the manufacture of a multi-function device typically cause a display window on the device to display information in an appropriate localized language. These settings also cause the printing function on such a device to provide hardcopy output in the appropriate localized language. Furthermore, when the multi-function device includes a facsimile function, various telecommunications characteristics might also be set up at the same time as, or as part of, the localized language setting. Intricacies in telecommunications protocols unique to each region typically require that different telecommunications characteristics be set to operate in such devices depending on the particular region of operation. Telecommunications settings generally control operating characteristics such as what type of dial tone is used, the amount of time between the initiation of a telephone call and the beginning of data transfer, the amount of time between dial tones, and so on.

There are disadvantages, however, with current methods of setting localized languages and telecommunications characteristics in such multi-function and printer devices. The disadvantages stem primarily from the need to manufacture a specific device so that it will function in a particular language and with particular telecommunications characteristics that are appropriate to the region in which the device will be sold. Thus, a manufacturing center may produce a first quantity of a specific device to function with a first language and telecommunications characteristics and a second quantity of the same device to function with a second language and telecommunications characteristics. Similarly, a first manufacturing center located in a first region may produce a quantity of a specific device to function with a language and telecommunications characteristics appropriate for the first region, while a second manufacturing center located in a second region may produce a different quantity of the same device to function with a language and telecommunications characteristics appropriate for the second region.

In any event, managing the various types of devices manufactured to function using various specific languages and telecommunications characteristics is a significant task. For example, the language/telecommunications-specific devices must be properly inventoried and shipped to appropriate regional distribution centers. Language/telecommunications-specific devices are often stock-piled at different regional distribution centers in an attempt to satisfy projected demands in the various regions. In addition to costs associated with adjusting and tracking inventories in the numerous regions to meet projected demands, there are considerable storage costs resulting from having to stock-pile the language/telecommunications-specific devices at regional distribution centers. Moreover, if there are low sell-through rates in various regions resulting from a downturn in the regional market or from incorrect demand projections, storage costs will increase and inventory may go unsold. Costs associated with reconfiguring language/telecommunications-specific devices to function in a different region are very high, if not prohibitive.

Accordingly, the need exists for a way to make localized language and telecommunications settings within multi-functional devices having printer functionality that alleviates costs associated with current methods of manufacturing, inventorying, and storing such devices.

SUMMARY

A multi-function device that includes scanning and printing functions is configurable by a user to operate in a user-preferred localized language. Embedded information from a scanned image identifies a localized language preference and sets up a multi-function device to operate in the preferred localized language.

In a particular embodiment, a card or sheet of paper includes various barcodes, each of which is associated with a different localized language. A user identifies a particular barcode (e.g., by placing a check mark next to the barcode) associated with the user's preferred language. When the user scans the card or sheet of paper using the scanner on the multi-function device, the device decodes information embedded in the identified barcode to determine the user's preferred localized language and to set the device to function in that language.

In another embodiment, setting a user's preferred localized language additionally sets appropriate telecommunications characteristics for a multi-function device.

BRIEF DESCRIPTION OF THE DRAWINGS

The same reference numbers are used throughout the drawings to reference like components and features.

DETAILED DESCRIPTION

The present disclosure relates to determining and making an appropriate localized language setting (and telecommunications settings when appropriate) in a multi-function device that includes a scanner and a printer. Rather than configuring the language setting for such multi-function printer/scanner devices during manufacturing, the language setting can be configured by the end user after a device is delivered. Advantages of the disclosed system and methods include a decreased variation in the types of devices being manufactured and an associated reduction in inventory tracking and storage costs.

Figure 1:
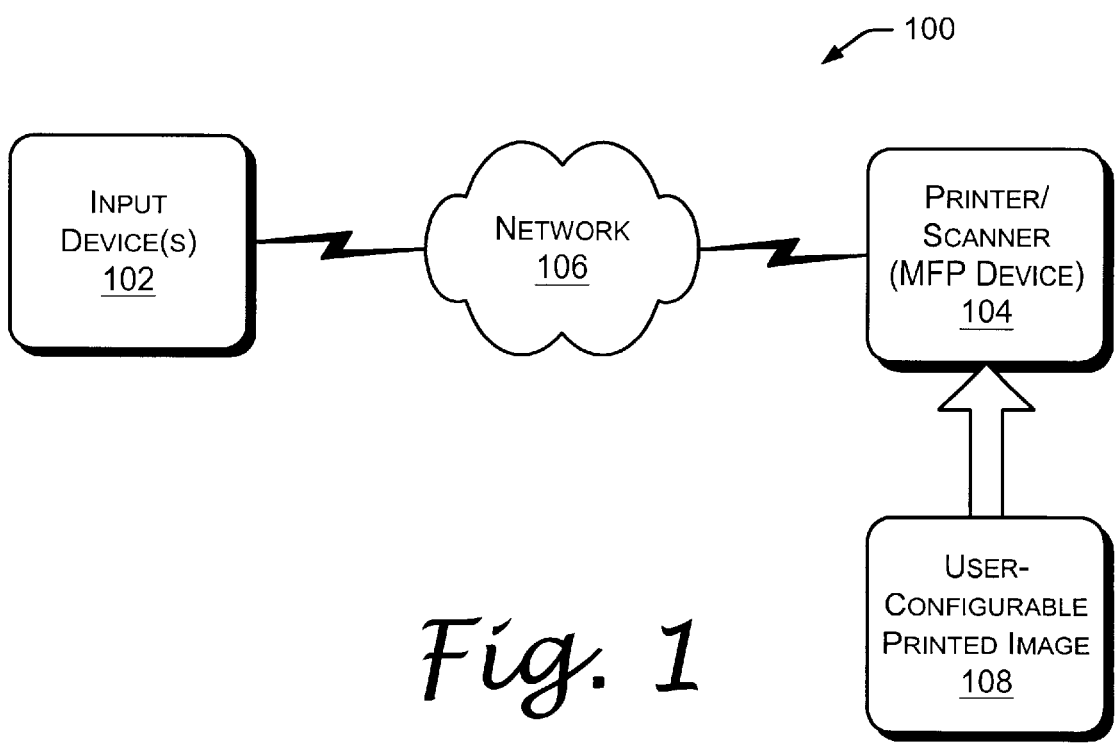
FIG. 1 illustrates a system environment suitable for making language localization and telecommunications settings on a multi-function device through scanning a user-configurable printed image.

Exemplary System Environment for Making Language Localization and Telecommunications Settings on A Multi-Function Device FIG. 1 illustrates an example of a system environment 100 suitable for making a language localization (and telecommunications settings when appropriate) on a multi-function printer/scanner device through scanning a user-configurable printed image. The system 100 includes input device(s) 102, printer/scanner MFP (multi-function peripheral) device(s) 104, and a communication network 106 operatively coupling input device(s) 102 to MFP device(s) 104. The system 100 also includes a user-configurable printed image 108 intended for scanning on MFP printer/scanner device 104.

The communication network 106 can include both local and remote connections depending on the particular system configuration. Thus, network connection 106 may include, for example, a printer cable, a LAN (local area network), a WAN (wide area network), an intranet, the Internet, and other such suitable communications links. Network connection 106 can also include wireless communications links such as IR (infrared) or RF (radio frequency) links.

Input device(s) 102 can be implemented as a variety of general purpose computing devices including, for example, a personal computer (PC), a laptop computer, a handheld PDA (e.g., Palmtop, PalmPilot), a Macintosh, a workstation computer, and other devices configured to communicate with MFP device(s) 104. An input device 102 typically provides a user with the ability to manipulate or otherwise prepare in electronic form, an image or document to be rendered as an image that is printed or otherwise formed onto a print medium by an MFP printer/scanner device 104 after transmission over network 106. In general, input device 102 outputs data to device 104 in a suitable PDL (page description language) driver format, such as PCL or PostScript. The printing component of MFP printer/scanner device 104 converts the data and outputs it onto an appropriate recording media, such as paper or transparencies. Depending on additional functions that may be available on an MFP printer/scanner device 104, images, documents, and other data from input device 102 may be processed by device 104 in other ways, such as being transmitted as facsimile documents.

This disclosure is applicable to various types of MFP devices 104 that include printing and scanning components. In addition to components implementing printing and scanning functions, an MFP device 104 may include other components implementing other functions such as facsimile and copying functions. When MFP device 104 includes a facsimile component, the system 100 and subsequently described embodiments facilitate appropriate telecommunications settings within the device 104 along with making an appropriate localized language setting. The printing component (see FIG. 2, 228) of an MFP device 104 can include component devices such as laser-based printers, ink-based printers, dot matrix printers, dry medium printers, plotters and the like that are capable of rendering formatted (e.g., PDL) data in printed form on a print medium, such as printing pixels on paper.

Although the scanning component (see FIG. 2, 232) of MFP device 104 is generally described herein in a manner consistent with a flatbed scanner, the scanning component might also be embodied as a sheet-fed scanner, an overhead scanner, a copyboard scanner, or any other appropriate scanning mechanism.

In general, as discussed in greater detail below with reference to particular embodiments, the system 100 of FIG. 1 permits a user to configure printed image 108 and scan it into MFP printer/scanner device 104 so that MFP device 104 will operate in a localized language preferred by the user.

Figure 2:
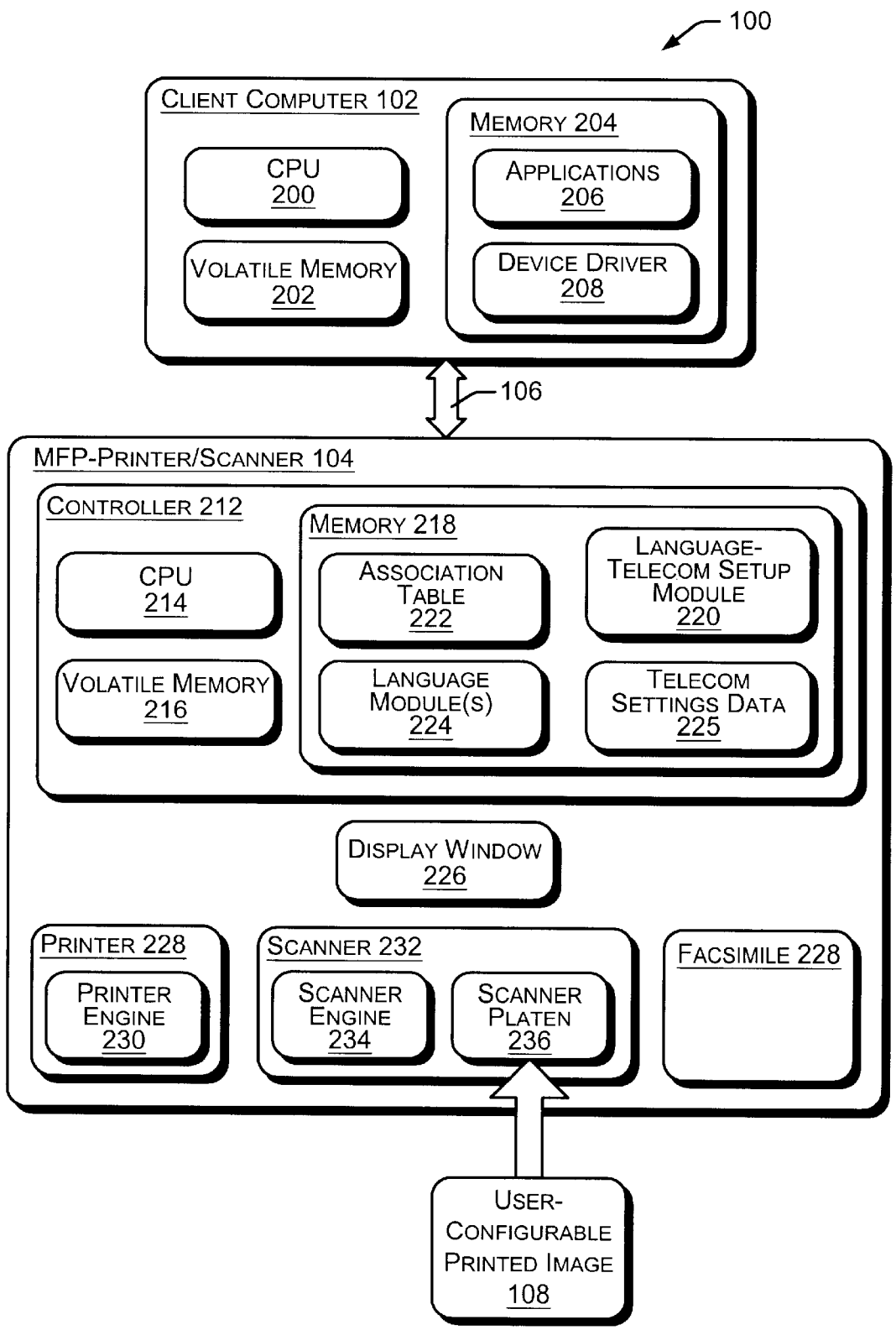
FIG. 2 is a block diagram illustrating in greater detail, an exemplary embodiment of an input device and a multi-function device suitable for implementation in the system environment of FIG. 1.

Exemplary System Embodiment for Making Language Localization and Telecommunications Settings on A Multi-Function Device FIG. 2 is a block diagram illustrating in greater detail, an exemplary embodiment of an input device 102 and an MFP device 104 suitable for implementation in the system environment of FIG. 1. Input device 102 is embodied as a client computer 102 operatively coupled to MFP device 104. MFP device 104 is generally configured to scan a user-configurable printed image 108 and thereafter display information and provide hardcopy output in a localized language based on information from the scanned printed image 108.

Client computer 102 typically includes a processor 200, a volatile memory 202 (i.e., RAM), and a nonvolatile memory 204 (e.g., ROM, hard disk, floppy disk, CD-ROM, etc.). Nonvolatile memory 204 generally provides storage of computer/processor-readable instructions, data structures, program modules and other data for client computer 102. Client computer 102 may implement various application programs 206 stored in memory 204 and executable on processor 200 to create or otherwise form a document or image (e.g., text and/or graphics) on a computer screen that is transferable over network connection 106 to MFP device 104 for rendering. Rendering may include any function for which MFP device 104 is enabled such as, for example, sending a facsimile of a document/image or creating a printed hard copy of the document/image. Such applications 206 might include software programs implementing, for example, word processors, spread sheets, browsers, multimedia players, illustrators, computer-aided design tools and the like.

Client computer 102 may also implement one or more software-based device drivers such as driver 208 that are stored in nonvolatile memory 204 and executed on processor 200. Device drivers might also be implemented on the specific devices they are "driving" such as MFP device 104. An example of driver 208 is a printer driver 208 configured to format document information into a page description language (PDL) such as PostScript or Printer Control Language (PCL) or another appropriate format which is output to MFP device 104 for rendering by a printer component of device 104.

MFP device 104 of the FIG. 2 embodiment includes controller 212 that, in general, processes data from client computer 102 to control the output of various functional components of device 104, such as printer 228 and scanner 232 through printer engine 230 and scanner engine 234, respectively. MFP device 104 might also include additional functional components such as a facsimile component 238 and a copier (not shown) for which controller 212 may process data. The controller 212 typically includes a data processing unit or CPU 214, a volatile memory 216 (i.e., RAM), and a nonvolatile memory 218. Nonvolatile memory 218 can include various computer storage media such as ROM, flash memory, a hard disk, a removable floppy disk, a removable optical disk and the like. Nonvolatile memory 218 generally provides storage of computer/processor-readable instructions, data structures, program modules and other data for MFP device 104.

Accordingly, nonvolatile memory 218 includes a language-telecommunications setup module 220, an association table 222, and one or more language modules 224. When MFP device 104 includes a facsimile component 238, nonvolatile memory 218 also typically includes telecommunications settings data 225. Language-telecommunications setup module 220 is generally configured to execute in a startup mode of MFP device 104 and to decode or interpret data embedded in printed image 108 that is scanned in through scanner 232. Association table 222 is a reference table used by language-telecommunications setup module 220 to compare information from printed image 108 and determine an appropriate language module 224 and telecommunications settings 225 for implementation within MFP device 104. Language modules 224 generally include a language module for each language that an MFP device 104 manufacturer intends to accommodate in numerous regions throughout the world. Each region typically has specific telecommunications characteristics that are implemented through telecommunications settings 225 once an appropriate match is made within association table 222. The language-telecommunications setup module 220, association table 222, language modules 224, and telecommunications settings 225 are discussed more fully below.

MFP device 104 of FIG. 2 additionally includes display window 226, printer component 228, and scanner component 232. As mentioned above, MFP device 104 might also include additional functional components such as facsimile component 238. Display window 226 is a user interface through which information about MFP device 104 is conveyed to a user, and through which a user might enter information into MFP device 104. Printer component 228 includes printer engine 230 and is generally configured for rendering document and image data received from client computer 102 as printed hard copy output. Scanner component 232 includes scanner engine 234 and scanner platen 236. Scanner platen 236 is typically a glass plate configured to receive hardcopy documents or images, such as user-configurable printed image 108, for scanning through scanner engine 234. Facsimile component 238 is generally configured to transmit duplicate copies of scanned images via a telecommunications network such as might be implemented by network 106.

As mentioned above, language-telecommunications setup module 220 executes when MFP device 104 is in a startup mode. A startup mode typically occurs upon the initial power-up of MFP device 104 by a user. A startup mode might also occur through the entry of certain device initialization data through, for example, display window 226. Upon power-up into a startup mode, language-telecommunications setup module 220 executes to receive user-configurable printed image 108 data as scanned in through scanner component 232. Printed image 108 is configured to contain embedded information regarding which language module 224 the language-telecommunications setup module 220 is supposed to enable for future execution in MFP device 104. Whatever localized language is associated with the enabled language module 224 is the language in which information will thereafter be displayed through display window 226 and printed as hardcopy output through printer component 228. Printed image 108 may additionally be configured with information regarding which telecommunications settings 225 to implement in MFP device 104. Once the MFP device 104 is set to a localized language and telecommunications settings, language-telecommunications setup module 220 takes the MFP device 104 out of startup mode and puts it into a normal operating mode. The MFP device 104 will function using the set localized language and telecommunications settings until another startup mode is entered and the localized language and telecommunications settings are reset.

The user-configurable printed image 108 accompanies the MFP device 104 when a user purchases the MFP device 104. The user-configurable printed image 108 may be on a card, a sheet of paper, or a page in a "getting started guide" booklet received with MFP device 104. The user-configurable printed image 108 contains any manner of machine-readable or scannable symbols capable of conveying information, such as barcodes or data glyphs.

The use of barcodes to store data as machine-readable symbols is well-known to those skilled in the art of printed embedded data technologies. A traditional barcode is a pattern of bars and spaces that represents various types of data. There are also two-dimensional and color barcodes that are capable of storing significantly more data than traditional barcodes. The use of data glyphs is also well-known to those skilled in the art of printed embedded data technologies. In general, images can be made up entirely of many tiny glyphs. Each glyph symbol is typically made up of a 45 degree diagonal line that is less than one-hundredth of an inch long. Each glyph symbol represents a single binary 0 or 1, depending on whether it slopes to the right or the left. Information conveying a preferred localized language is thus stored in symbols making up the user-configurable printed image 108.

The symbols may contain embedded data that language-telecommunications setup module 220 decodes into reference information used to determine a user's preferred language localization and appropriate telecommunications settings through association table 222. Thus, the embedded data would be matched through association table 222 with the correct language localization and appropriate telecommunications settings. This disclosure also contemplates that the symbols may contain embedded data that directly identifies a user's preferred language localization and appropriate telecommunications settings and that further enables language-telecommunications setup module 220 to make the appropriate language localization and telecommunications settings without reference to an association table 222 or other stored data.

Figure 3:
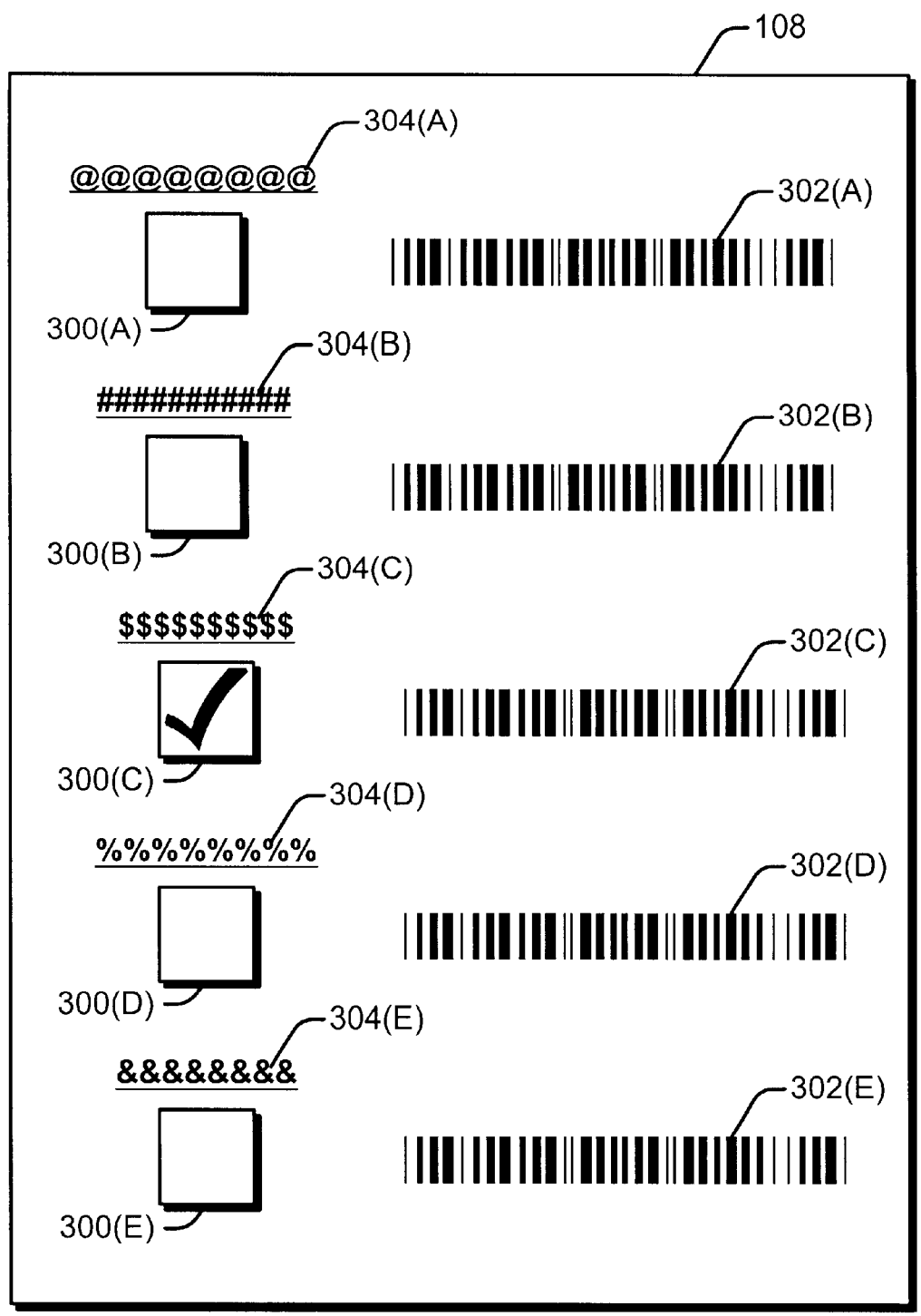
FIG. 3 is an example of a user-configurable printed image that might be used in the system environment of FIG. 1 to make language localization and telecommunications settings on a multi-function device.

FIG. 3 represents one possible example of a user-configurable printed image 108. The printed image 108 of FIG. 3 illustrates five available languages a user can choose from to set on MFP device 104. Although an MFP device 104 generally includes language modules 224 capable of implementing every language that an MFP device 104 manufacturer intends to accommodate in numerous regions throughout the world, the user-configurable printed image 108 and other materials such as "getting started guide" booklets are typically somewhat regionalized to include a subset of these total languages. Manufacturers can therefore produce many MFP devices 104 of the same configuration for distribution into numerous localized language regions, while only having to adjust the accompanying documentation that is distributed with the MFP devices 104. For example, the same MFP devices 104 can be manufactured and distributed into northern Europe and India as long as the accompanying documentation (i.e., user-configurable printed image 108) is appropriate for the given region and permits users to select an appropriate localized language for the region.

Referring again to the example of FIG. 3, the user-configurable printed image 108 illustrates five available languages from which a user can choose. To choose a preferred localized language, a user is instructed (e.g., through a "getting started guide") to place a check mark in one of the five check boxes 300(A–E). Each of the five barcodes 302(A–E) contains information sufficient to identify a localized language to the MFP device 104, while text descriptions 304(A–E) written in each of the five localized languages 304(A–E) identify the appropriate check box 300 a user should check for a preferred localized language setting. The barcodes 302(A–E) generally also contain information identifying appropriate telecommunications settings 225 for implementation in MFP device 104. A user's choice of a preferred localized language thereby automatically sets the telecommunications settings 225 appropriate to the region corresponding to the chosen localized language. Note that the symbols 304 above each check box 300 are intended to represent the name of localized languages written in characters of the particular localized language.

In the example of FIG. 3, a user has checked box 300(C) representing localized language 304(C). The user is further instructed to power-up the MFP device 104 and scan the printed image 108 after selecting a preferred localized language setting. Language-telecommunications setup module 220 executes as discussed above to recognize the user-designated barcode 302(C) from the scanned image 108 and to determine and set the preferred localized language (and telecommunications settings 225 when appropriate) for the MFP device 104 based on the designated barcode 302(C).

Figure 4:
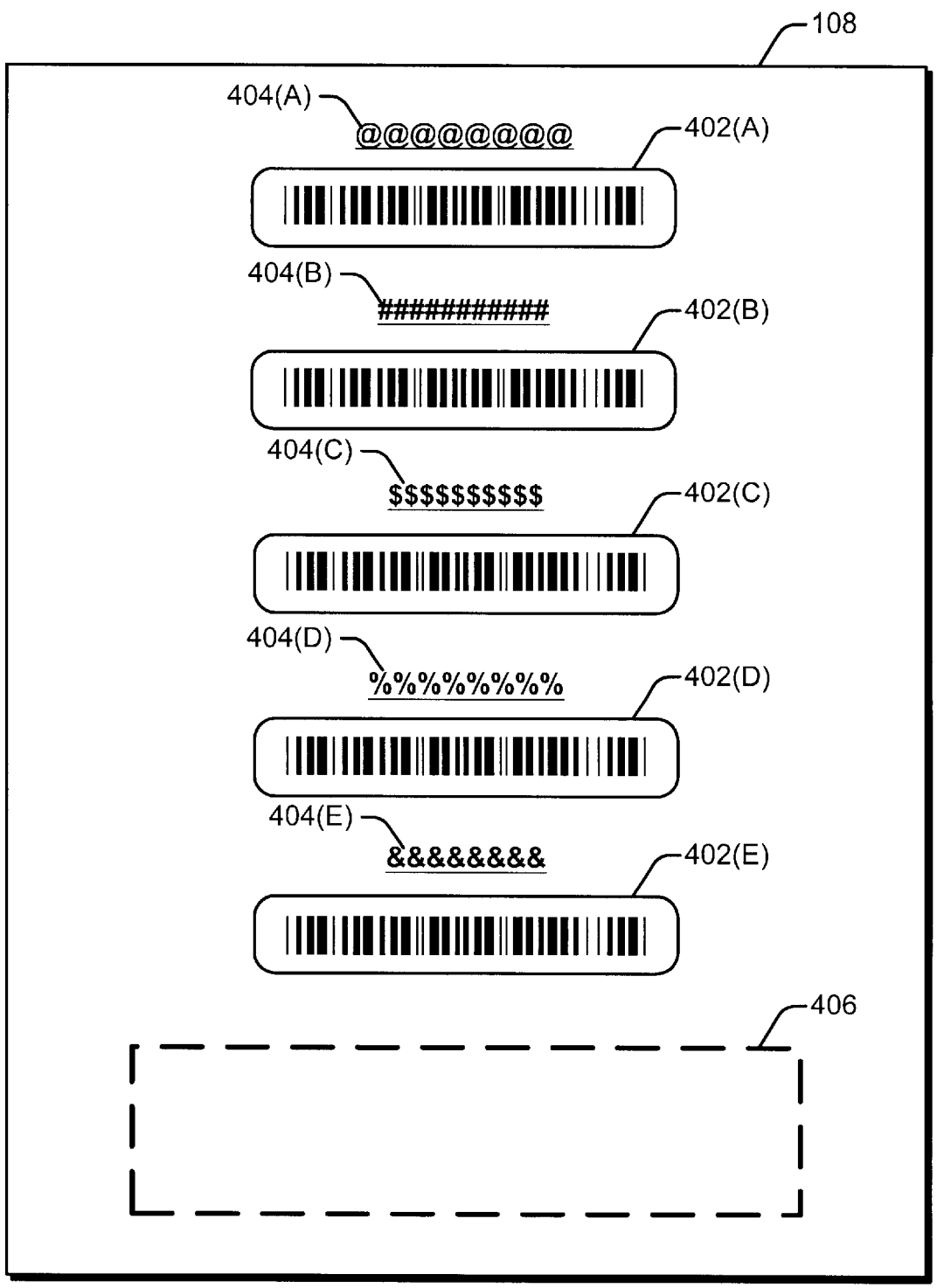
FIG. 4 is an additional example of a user-configurable printed image that might be used in the system environment of FIG. 1 to make language localization and telecommunications settings on a multi-function device.

FIG. 4 represents another example of a user-configurable printed image 108 that might be included with an MFP device 104 to permit a user to select a preferred localized language setting. In the FIG. 4 example, a user is instructed (e.g., through a "getting started guide") to select an appropriate barcode 402(A–E) representing a preferred localized language 404(A–E) and to peel the barcode 402 from its current location and paste it into a scan location 406 represented by the dashed line 406. The user is further instructed as discussed above, to power-up the MFP device 104 and scan the printed image 108 after selecting a preferred localized language setting in the described manner. Language-telecommunications setup module 220 executes as discussed above to recognize the user-designated barcode 402 in the scan location 406 of the scanned image 108 and to determine and set the preferred localized language (and telecommunications settings 225 when appropriate) for the MFP device 104 based on the designated barcode 402.

It is noted that there are many possible ways of configuring such user-configurable printed image 108 to achieve the general purpose of enabling a user to select a preferred localized language setting. Thus, the printed images 108 discussed with respect to FIGS. 3 and 4 are illustrated by way of example and not limitation.

Exemplary Methods for Making Language Localization and Telecommunications Settings on A Multi-Function Device Example methods for making a language localization and telecommunications settings in a multi-function printer/scanner device 104 will now be described with primary reference to FIGS. 5–7. The methods apply generally to the exemplary embodiments discussed above with respect to FIGS. 1–4. The elements of the described methods may be performed by any appropriate means, such as by the execution of processor-readable instructions defined on processor-readable media, such as a disk, a ROM or other such memory device.

Figure 5:
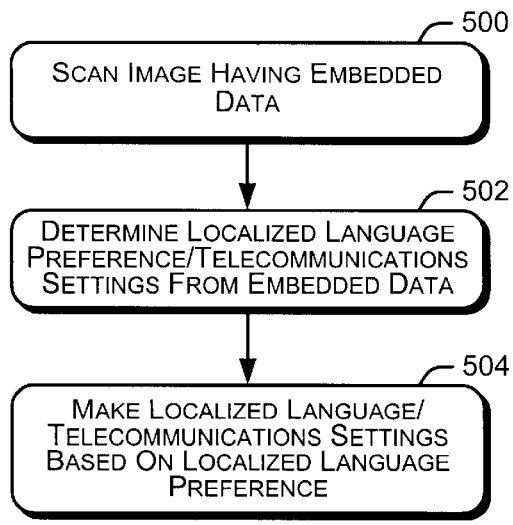
FIG. 5 is a flow diagram illustrating an example method of making language localization and telecommunications settings in a multi-function device such as that shown in the system environment of FIG. 1.

Referring to the method illustrated in FIG. 5, at block 500, an image having embedded data is scanned. The image is configurable by a user to indicate the user's preference for language localization, and is scanned by a multi-function device having an integrated scanner and printer. At block 502, the localized language preference is determined from the embedded data in the scanned image. If it is appropriate to an MFP device 104, such as when a facsimile component 238 is present on MFP device 104, appropriate telecommunications settings are also determined from the embedded data in the scanned image. At block 504, a localized language setting (and telecommunications settings 225 when appropriate) is made in the multi-function device based on the localized language preference.

Figure 6:
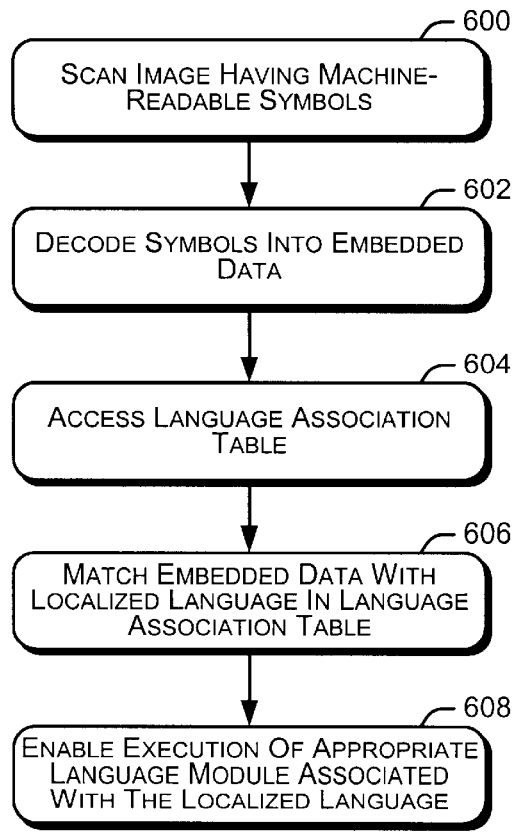
FIG. 6 is a flow diagram illustrating an alternate example method of making language localization and telecommunications settings in a multi-function device such as that shown in the system environment of FIG. 1.

Referring now to the method illustrated in FIG. 6, at block 600, an image is scanned that has machine-readable symbols. The image is configurable by a user to indicate the user's preference for language localization, and is scanned by a multi function device having an integrated scanner and printer. At block 602, the machine-readable symbols are decoded to reveal embedded data. At block 604, an association table is accessed. At block 606, the embedded data is matched up with a localized language (and telecommunications settings 225 when appropriate) through the association table. At block 608, a language module (and telecommunications settings 225 when appropriate) associated with the localized language is enabled.

Figure 7:
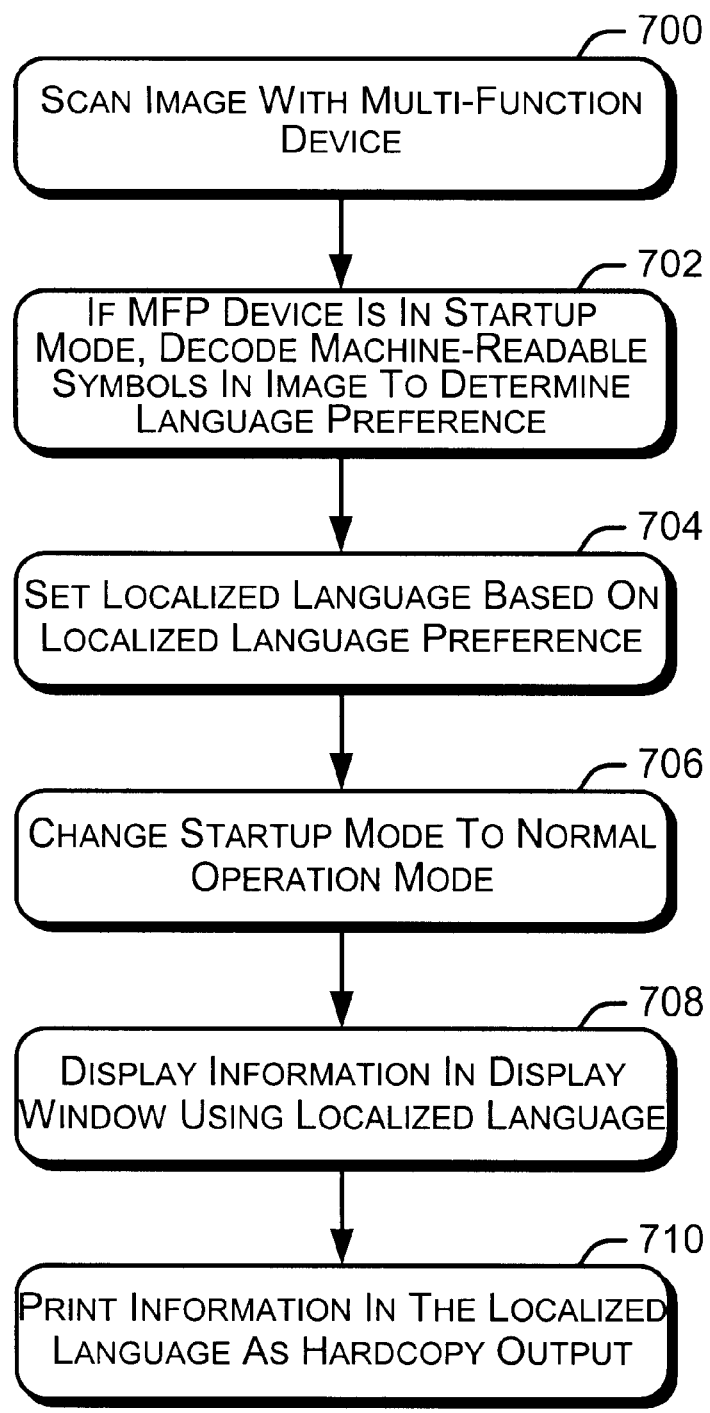
FIG. 7 is a flow diagram illustrating another alternate example method of making language localization and telecommunications settings in a multi-function device such as that shown in the system environment of FIG. 1.

Referring now to the method illustrated in FIG. 7, at block 700, an image is scanned with a multi-function device. The image is configurable by a user to indicate the user's preference for language localization, and the multi-function device includes an integrated scanner and printer. At block 702, machine-readable symbols from the scanned image are decoded to determine a language preference (and telecommunications settings 225 when appropriate) if the multi-function device is in a startup mode. At block 704, a localized language (and telecommunications settings 225 when appropriate) is set for the multi-function device based on the language preference. At block 706, the multi-function device is taken out of startup mode and put into a normal operation mode. At block 708, information is displayed in a display window of the multi-function device using the localized language. At block 710, information is printed as hardcopy output using the localized language.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

Additionally, while one or more methods have been disclosed by means of flow diagrams and text associated with the blocks of the flow diagrams, it is to be understood that the blocks do not necessarily have to be performed in the order in which they were presented, and that an alternative order may result in similar advantages.

What is claimed is:

1. A processor-readable medium comprising processor-executable instructions configured for:
   scanning an image having embedded data;
   determining a localized language preference from the embedded data; and
   setting a localized language based on the localized language preference.

2. A processor-readable medium as recited in claim 1, wherein the determining a localized language preference from the embedded data further comprises:
   accessing an association table; and
   matching the embedded data with the localized language within the association table.

3. A processor-readable medium as recited in claim 1, comprising further processor-executable instructions configured for:
   determining telecommunications settings from the embedded data; and
   setting telecommunications characteristics based on the telecommunications settings.

4. A processor-readable medium as recited in claim 1, wherein the image comprises machine-readable symbols, the scanning further comprising decoding the machine-readable symbols into the embedded data.

5. A processor-readable medium as recited in claim 4, wherein the machine-readable symbols are symbols selected from the group of symbols comprising:
   barcode symbols; and
   dataglyph symbols.

6. A processor-readable medium as recited in claim 1, wherein the setting further comprises enabling the execution of a language module associated with the localized language preference.

7. A processor-readable medium comprising processor-executable instructions configured for:
   scanning an image with a multi-functional device;
   if the multi-functional device is in a startup mode, decoding machine-readable symbols in the image to determine a language preference; and
   setting a localized language in the multi-functional device based on the language preference.

8. A processor-readable medium as recited in claim 7, comprising fiber processor-executable instructions configured for:
   if the multi-functional device is in a startup mode, making telecommunications settings based on the language preference.

9. A processor-readable medium as recited in claim 7, comprising further processor-executable instructions configured for changing the startup mode to a normal operation mode once the localized language is set in the multi-functional device.

10. A processor-readable medium as recited in claim 7, comprising further processor-executable instructions configured for displaying information in a display window of the multi-functional device using the localized language.

11. A processor-readable medium as recited in claim 7, wherein the setting fiber comprises enabling the execution of a language module associated with the language preference.

12. A processor-readable medium comprising processor-executable instructions configured for:
    scanning an image having machine-readable symbols;
    decoding the machine-readable symbols to determine a language preference; and
    setting a localized language in a multi-functional device based on the language preference.

13. A processor-readable medium as recited in claim 12, comprising further processor-executable instructions configured for displaying information in a display window of the multi-functional device using the localized language.

14. A processor-readable medium as recited in claim 12, comprising further processor-executable instructions configured for printing information in the localized language as hardcopy output onto various print media.

15. A processor-readable medium as recited in claim 12, wherein the setting further comprises enabling the execution of a language module associated with the language preference.

16. A method of setting a localized language in a multi-functional device comprising:
    scanning an image having embedded data;
    determining a localized language preference from the embedded data; and
    setting a localized language based on the localized language preference.

17. A method of setting a localized language in a multi-functional device comprising:
    scanning an image with a scanner component of the multi-functional device;
    if the multi-functional device is in a startup mode, decoding machine-readable symbols in the image to determine a language preference; and
    setting a localized language in the multi-functional device based on the language preference.

18. A method comprising:
    scanning an image having machine-readable symbols;
    decoding the machine-readable symbols to determine a language preference; and
    setting a localized language in a multi-functional device based on the language preference.

19. A multi-functional device comprising:
    a scanner;
    a plurality of language modules; and
    a language-telecommunications setup module configured to execute in a startup mode to decode a scanned image from the scanner into decoded data and, based on the decoded data, to enable a particular language module from the plurality of language modules.

20. A multi-functional device as recited in claim 19, further comprising:
    a facsimile component; and
    telecommunications settings;
    the language-telecommunications setup module further configured to make appropriate telecommunications settings based on the decoded data.

21. A multi-functional device as recited in claim 19, further comprising a display window for displaying information in a localized language associated with the particular language module.

22. A multi-functional device as recited in claim 19, further comprising one or more additional functional components selected from the group of functional components comprising:

a printer; and a copier.

23. A multi-functional device as recited in claim 19, further comprising a an association table to associate the decoded data with the particular language module.

24. A multi-functional device comprising:

means for scanning an image;

means for decoding data embedded within the image;

means for setting a localized language for the multi-functional device based on the data.

25. A multi-functional device as recited in claim 24, further comprising means for making telecommunications settings based on the data.

26. A multi-functional device as recited in claim 24, further comprising:

means for displaying information in a display window in the localized language; and means for printing information in the localized language as hardcopy output onto various print media.

27. A system comprising:

a multi-functional device;

a user-configurable printed image scannable by the multi-function device and configured to convey a language preference and enable an associated language module within the multi-function device.

28. A system as recited in claim 27, wherein the multi-function device further comprises:

a plurality of language modules;

an association table configured to correlate data from the user-configurable printed image with the associated language module from the plurality of language modules;

a scanner to scan images;

a printer to print hardcopy output in the localized language; and a display window to display information in the localized language.

\* \* \* \* \*

UNITED STATES PATENT AND TRADEMARK OFFICE
CERTIFICATE OF CORRECTION

PATENT NO. : 6,669,085 B1
DATED : December 30, 2003
INVENTOR(S) : George Fred Bergen It is certified that error appears in the above-identified patent and that said Letters Patent is hereby corrected as shown below:

Column 10,
Line 2, delete "fiber" and insert therefor -- further --

Column 11,
Line 8, after "comprising" delete "a"

Signed and Sealed this

Second Day of August, 2005

JON W. DUDAS
*Director of the United States Patent and Trademark Office*